US012275122B2

(12) United States Patent
Martinez

(10) Patent No.: US 12,275,122 B2
(45) Date of Patent: Apr. 15, 2025

(54) FASTENER SECURING SLEEVE

(71) Applicant: James Martinez, Grand Junction, CO (US)

(72) Inventor: James Martinez, Grand Junction, CO (US)

( * ) Notice: Subject to any disclaimer, the term of this patent is extended or adjusted under 35 U.S.C. 154(b) by 300 days.

(21) Appl. No.: 17/688,897

(22) Filed: Mar. 8, 2022

(65) Prior Publication Data

US 2022/0288753 A1 Sep. 15, 2022

Related U.S. Application Data

(60) Provisional application No. 63/207,596, filed on Mar. 11, 2021.

(51) Int. Cl.
*B25B 23/10* (2006.01)
*B25B 13/04* (2006.01)
*B25B 13/06* (2006.01)

(52) U.S. Cl.
CPC ............ *B25B 23/108* (2013.01); *B25B 13/04* (2013.01); *B25B 13/06* (2013.01)

(58) Field of Classification Search
CPC ......... B25B 13/04; B25B 13/06; B25B 23/10; B25B 23/108; B25B 13/58
See application file for complete search history.

(56) References Cited

U.S. PATENT DOCUMENTS

| | | | | | |
|---|---|---|---|---|---|
| 2,491,089 | A | * | 12/1949 | Cowden | B25B 23/108 81/125 |
| 3,834,253 | A | * | 9/1974 | Carr | B25B 23/108 81/125 |
| 3,835,737 | A | * | 9/1974 | Carr | B25B 23/108 81/125 |
| 4,139,036 | A | * | 2/1979 | Regan | B25B 23/045 227/136 |
| 4,455,898 | A | * | 6/1984 | Marbourg, Jr. | B25B 23/101 81/454 |
| 4,526,072 | A | * | 7/1985 | Manhoff, Jr. | B25B 23/101 81/452 |
| 4,631,985 | A | * | 12/1986 | Roberts | B25C 3/008 81/44 |
| 4,744,273 | A | * | 5/1988 | Bartok, Jr. | B25B 23/10 81/125 |
| 4,776,740 | A | * | 10/1988 | Holton | F16B 21/20 411/521 |
| 4,800,786 | A | * | 1/1989 | Arnold | B29C 66/723 81/177.1 |
| 4,819,856 | A | * | 4/1989 | Davern | B21J 15/32 227/119 |
| 4,947,713 | A | * | 8/1990 | Arnold | B25B 13/06 81/184 |
| 4,998,452 | A | * | 3/1991 | Blum | B25B 23/045 206/820 |

(Continued)

*Primary Examiner* — David B. Thomas

(57) ABSTRACT

A fastener securing sleeve; the fastener securing sleeve includes a pliable sleeve configured to releasably-secure a fastener to a tool-head of a tool in order to set and start the fastener. The pliable sleeve includes an X-pattern slit having a series of flaps configured to receive and secure the fastener within when used. The fastener securing sleeve provides a device for application upon the tool-head of a wrench or upon a socket, and releasably-secures nuts, bolts, screws, and other fasteners to such tools in order to assist a user when setting and starting a fastener.

8 Claims, 8 Drawing Sheets

(56) References Cited

U.S. PATENT DOCUMENTS

| | | | | | |
|---|---|---|---|---|---|
| 5,065,649 | A * | 11/1991 | Evers | B25B 23/101 | 81/125 |
| 5,129,292 | A * | 7/1992 | Albert | B25B 23/101 | 81/452 |
| 5,896,792 | A * | 4/1999 | Hurt | B25B 23/0035 | 81/125 |
| 6,116,125 | A * | 9/2000 | McLeod | B25B 23/101 | 81/451 |
| 6,128,982 | A * | 10/2000 | Gwin, Sr. | B25B 23/101 | 81/452 |
| 6,450,479 | B1 * | 9/2002 | Reynolds | B25G 1/005 | 251/291 |
| 7,104,167 | B2 * | 9/2006 | Babij, Jr. | B25B 23/045 | 81/125 |
| 7,437,975 | B1 * | 10/2008 | De Anfrasio | B25B 13/06 | 81/125 |
| 7,650,991 | B2 * | 1/2010 | Hester | B25B 23/00 | 606/104 |
| 7,757,590 | B2 * | 7/2010 | Swartz | B25B 23/101 | 81/452 |
| 8,726,769 | B1 * | 5/2014 | Jacker | B25B 23/101 | 81/451 |
| 9,232,778 | B1 * | 1/2016 | De Sernia | A01K 97/10 | |
| 11,780,065 | B2 * | 10/2023 | Berkovits | B25B 23/005 | 81/57.37 |
| 2007/0295172 | A1 * | 12/2007 | Swartz | B25B 23/101 | 81/452 |
| 2011/0243683 | A1 * | 10/2011 | Howe | F16B 13/0866 | 411/24 |
| 2015/0059538 | A1 * | 3/2015 | Kauffman | B25B 23/101 | 81/452 |
| 2015/0283683 | A1 * | 10/2015 | Ilzarbe Ripoll | B25B 23/101 | 81/451 |
| 2016/0010676 | A1 * | 1/2016 | Swinderman | B25B 13/56 | 411/347 |
| 2018/0065236 | A1 * | 3/2018 | Begley | B25C 9/00 | |
| 2019/0009392 | A1 * | 1/2019 | Violette | B25B 15/02 | |
| 2023/0213049 | A1 * | 7/2023 | Cho | H01M 50/20 | 411/337 |

* cited by examiner

FASTENER SECURING SLEEVE

CROSS-REFERENCE TO RELATED APPLICATION(S)

The present application is related to and claims priority to U.S. Provisional Patent Application No. 63/207,596 filed Mar. 11, 2021, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of sleeves of existing art and more specifically relates to arrangements for handling screws or nuts for holding or positioning screw or nut prior to or during its rotation using mechanical gripping means for hand-driven screw-drivers and tools.

RELATED ART

Tightening and loosening of bolts, nuts and other fasteners can be a difficult task. When those fasteners fall from sockets and wrenches the task becomes even more difficult. Trying to retrieve those fasteners, especially from enclosed areas crowded by other objects, can be extremely difficult. It causes frustration and wastes productive time which may increase labor costs in professional environments. The environments in which those tools are used make this common problem even worse. When it happens under the hood of your car, for example, a person can't just simply retrieve that fallen bolt with ease. They must hunt for it in a tight and unlit space, then come up with a way to retrieve it.

Several attempts have been made to solve this common problem including use of magnets. However, as a magnet requires that a corresponding fastener is magnetic, magnet tip drivers are limited to use with magnetic fasteners. Magnetic sockets will not hold fasteners made of brass, copper, zinc or aluminum. Additionally, magnetic sockets can attract metal shards and fragments, which can affect the placement of fasteners, thus potentially resulting in improper placement as well as scrapes and gouges. Another inadequate means of solving this issue is the use of adhesive tape, caulk, and other adhesives to maintain fasteners within sockets. Whereas adhesive tape may hold a fastener within a socket, the tape can result in the socket clinging to the fastener upon removal of the wrench handle. Caulk and other adhesives can remain visible upon fasteners after application, leaving an unsightly remnant or residue that can affect the appearance of the overall object being serviced. A suitable solution is desired.

U.S. Pat. Pub. No. 2007/0295172 to Darian Swartz relates to a fastener holding device. The described fastener holding device is a sleeve for retaining a fastener against a driver bit includes a resiliently flexible shaft sleeve for frictional engagement against a driver shaft. A lower sleeve is provided having an inner diameter size for engagement over and around the head of a fastener.

SUMMARY OF THE INVENTION

In view of the foregoing disadvantages inherent in the known sleeve art, the present disclosure provides a novel fastener securing sleeve. The general purpose of the present disclosure, which will be described subsequently in greater detail, is to provide a fastener securing sleeve for application upon the head of a wrench or upon a socket, and that releasably-secures nuts, bolts, screws, and other fasteners to these tools.

A fastener securing sleeve is disclosed herein. The first-embodiment of the fastener securing sleeve may include a pliable sleeve comprising a substantially hollow cylindrical body. The pliable sleeve is configured to releasably-secure a fastener to a tool-head of a tool in order to set and start the fastener. The pliable sleeve includes an open first-end and a second-end. The open first-end is provided for receiving the tool-head. The second-end comprises an X-pattern slit having a series of flaps configured to receive and secure the fastener within when used. The first-embodiment of the fastener securing sleeve is configured to be used with a socket-wrench. The open first-end secures around a socket of the socket-wrench. The open first-end further preferably comprises a reinforced top edge. The reinforced top edge is provided to prevent the fastener securing sleeve from slipping off of the socket of the socket-wrench. The X-pattern slit is sized and arranged to allow a shaft portion of the fastener to pass therethrough and restricts a head portion of the fastener from passing therethrough while setting the fastener. The X-pattern slit located at the second-end comprises a diamond-shaped aperture at its center point. In a preferred embodiment, the second-end comprises a slight dome profile. The pliable sleeve has a length of approximately one-inch.

A method of using a first-embodiment of the fastener securing sleeve is as follows: a user may insert a socket upon a socket wrench, and then affix the fastener securing sleeve upon the socket. The user may then slip a fastener, such as but not limited to a bolt, through the X-pattern slit of the fastener securing sleeve and set the fastener within the socket. The user may then apply the fastener wherever needed, even in distant and obstructed locations, and even with only one hand holding the tool hosting the fastener securing sleeve. The fastener will remain secured within the socket. After mounting attachment of the fastener, the user may then simply pull the tool away, which will detach the fastener securing sleeve from the fastener.

According to another embodiment, a fastener securing sleeve is also disclosed herein. The second-embodiment of the fastener securing sleeve is configured to be used with a tool such as a box-end wrench. The fastener securing sleeve includes a pliable sleeve comprising a hollow disc-like body. The hollow disc-like body is configured to releasably-secure a fastener to a tool-head of a tool in order to set and start the fastener. The pliable sleeve comprises a side wall having an opening sized and configured to accept the tool-head, a first-end having an aperture, and a second-end comprising an X-pattern slit. The X-pattern slit has a series of flaps configured to receive and secure the fastener within. The fastener securing sleeve ensures that fasteners, including but not limited to nuts, bolts and screws, remain in wrenches and sockets during attempted applications of fasteners.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a fastener securing sleeve, constructed and operative according to the teachings of the present disclosure.

The various embodiments of the present invention will hereinafter be described in conjunction with the appended drawings, wherein like designations denote like elements.

DETAILED DESCRIPTION

Figure 1:
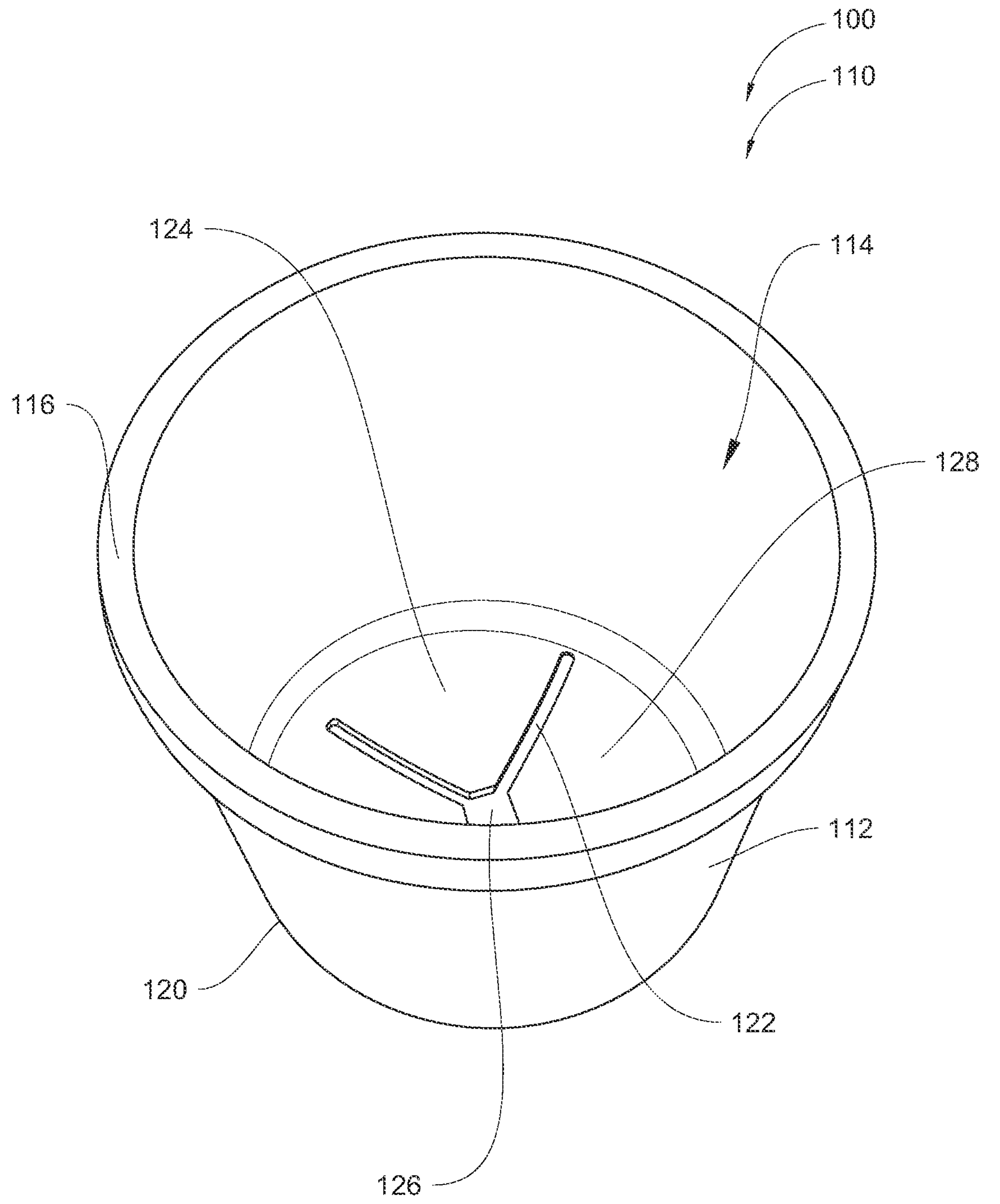
FIG. 1 is a top perspective view of a first-embodiment of the fastener securing sleeve during an 'in-use' condition, according to an embodiment of the disclosure.

As discussed above, embodiments of the present disclosure relate to a sleeve and more particularly to a fastener securing sleeve as used to improve the gripping of a fastener while a fastener is being started or set. The fastener securing sleeve eliminates the common inconvenience of fasteners falling from wrenches and/or sockets.

Generally, the fastener securing sleeve is an elasticized sleeve for application upon a head of a wrench or upon a socket, and releasably-secures nuts, bolts, screws, and other fasteners to these tools. The fastener securing sleeve effectively ensures that fasteners do not fall from host wrenches/sockets during attempted application of the fasteners. The fastener securing sleeve includes two separate-yet-similar designs for use with sockets and with box-end wrenches. In a first embodiment, the fastener securing sleeve is configured to be used with sockets. In this embodiment, the fastener securing sleeve features a hollow cylindrical sleeve with an open-first end and a second-end having an X-pattern slit having a series of flaps. In a second embodiment, the fastener securing sleeve is configured to be used with box-end wrenches. In this second embodiment, the fastener securing sleeve includes a partially open sidewall for application to the box-end wrench. The fastener securing sleeve especially improves the ease and productivity of applying fasteners in difficult to reach areas.

Both formats of the fastener securing sleeve may be made of nitrile butadiene rubber (NBR) of adequate elasticity. In the format for use with sockets, the fastener securing sleeve is formed in the shape of a hollow cylindrical sleeve of an approximate one-inch length. The sleeve features one closed distal end and the closed distal end is slotted. In the version for use with box-end wrenches, the fastener securing sleeve is formed in the shape of a hollow disc. A closed distal face is at one end of that sleeve, and said distal face is slotted. An open area, for application of the unit upon a box-end wrench, is featured within the sidewall.

The fastener securing sleeve can be made in many different sizes, lengths and shapes. The fastener securing sleeve may be made for use with sockets and wrenches of Society of Automotive Engineering (SAE) measurements (inches), metric measurements, or with both measurement systems. The fastener securing sleeve may be made in versions for use with both sockets and box-end wrenches, or may be made for use exclusively with sockets or box-end wrenches. The distal end of the fastener securing sleeve may host various slotted patterns.

The fastener securing sleeve can be made of various blends of the recommended nitrile materials, including but not limited to nitrile butadiene rubber (NBR), hydrogenated nitrile (HNBR), and carboxylated nitrile (CNBR). The recommended nitrile material is resistant to oil, water, hydraulic fluids, and fuels, ensuring that the fastener securing sleeve retains grip upon fasteners during use. The recommended nitrile material is chemically resistant to damages from oil, hydraulic fluids, and fuels, ensuring that the fastener securing sleeve is not harmed during use. The recommended nitrile material is resistant to damages from impact, abrasion, and tear, further ensuring that the fastener securing sleeve is not harmed during use. The fastener securing sleeve can also be made of various other applicable materials, including but not limited to acyrlobutadiene styrene (ABS), ethylene propylene diene monomer (EPDM), and neoprene. It can be made in variations of design for achieving the same intended purpose with open-end wrenches, adjustable wrenches, lockjaw wrenches, power drills, and other tools of applicability.

The fastener securing sleeve eliminates the loss in production time caused by searching for and reclaiming fasteners that have fallen from wrenches and/or sockets. Additionally, the fastener securing sleeve reduces the frustration and aggravation commonly caused by fasteners falling from wrenches and/or sockets. By reducing and/or preventing the common frustrations associated with fasteners falling from wrenches and/or sockets, the fastener securing sleeve helps improve the attitude, demeanor and proficiency of the user. By helping to improve the attitude, demeanor and proficiency of the user, the fastener securing sleeve further enhances the profitability of commercial users.

Referring now more specifically to the drawings by numerals of reference, there is shown in FIGS. 1-8, various views of a fastener securing sleeve 100.

FIG. 1 is a top perspective view of a first-embodiment of the fastener securing sleeve 100 during an 'in-use' condition, according to an embodiment of the disclosure. Here, the fastener securing sleeve 100 may be beneficial for use by a user to maintain a fastener 10 within a socket 25 or wrench while the fastener 10 is being started or set. As illustrated, the first-embodiment of the fastener securing sleeve 100 may include a pliable sleeve 110 comprising a substantially hollow cylindrical body 112. The pliable sleeve 110 is configured to releasably-secure a fastener 10 to a tool-head of a tool 30 in order to set and start the fastener 10. The pliable sleeve 110 includes an open first-end 114 and a second-end 120. The open first-end 114 is provided for receiving the tool-head. The second-end 120 comprises an X-pattern slit 122 having a series of flaps 124 configured to receive and secure the fastener 10 within when used. The fastener securing sleeve provides a device for application upon the tool-head of a wrench or upon a socket 25, and releasably-secures nuts, bolts, screws, and other fasteners 10 to such tools 30. The fastener securing sleeve improves the ease and productivity of applying fasteners 10.

Figure 2:
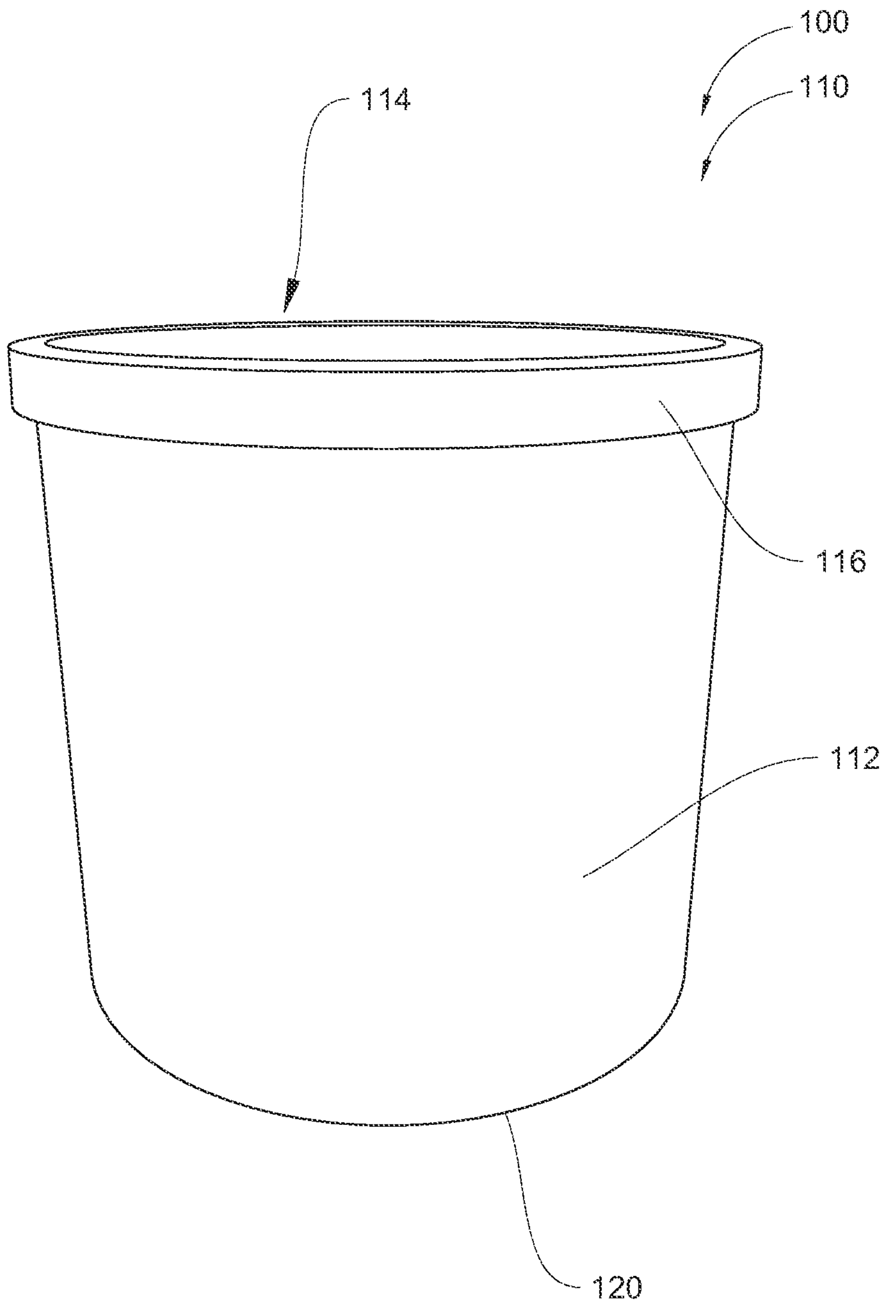
FIG. 2 is a side perspective view of the fastener securing sleeve of FIG. 1, according to an embodiment of the present disclosure.

FIG. 2 is a side perspective view of the fastener securing sleeve 100 of FIG. 1, according to an embodiment of the present disclosure. As above, the fastener securing sleeve 100 may include the pliable sleeve 110 comprising the substantially hollow cylindrical body 112 including the open first-end 114 and the second-end 120 having the X-pattern slit 122. The first-embodiment of the fastener securing sleeve 100 is configured to be used with a socket-wrench. The open first-end 114 secures around a socket 25 of the socket-wrench. The open first-end 114 further comprises a reinforced top edge 116. The reinforced top edge 116 is provided to prevent the fastener securing sleeve 100 from slipping off the socket 25 of the socket-wrench. Additionally, the reinforced top edge 116 prevents the fastener securing sleeve 100 from tearing. The fastener securing sleeve may be produced with variations in elasticity, allowing a single unit to accommodate different sized wrenches/sockets.

Figure 3:
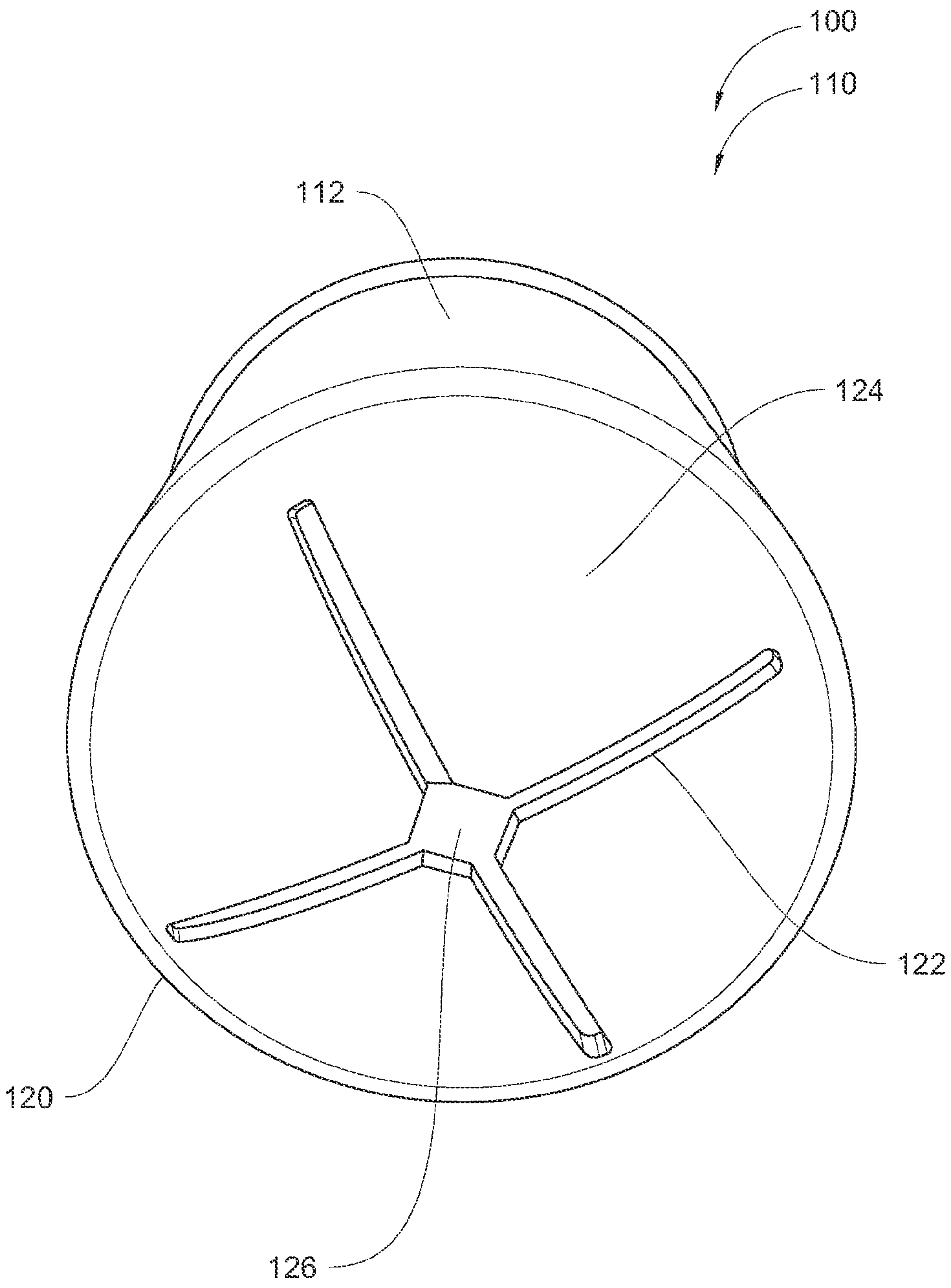
FIG. 3 is a bottom perspective view of the fastener securing sleeve of FIG. 1, according to an embodiment of the present disclosure.

FIG. 3 is a bottom perspective view of the fastener securing sleeve 100 of FIG. 1, according to an embodiment of the present disclosure. As shown, the first-embodiment of the fastener securing sleeve 100 comprises the substantially hollow cylindrical body 112 having the X-pattern slit 122 positioned at the second-end 120. The X-pattern slit 122 is sized and arranged to allow a shaft portion 15 of the fastener 10 to pass therethrough and restricts a head portion 20 of the fastener 10 from passing therethrough while setting the fastener 10. The X-pattern slit 122 located at the second-end 120 comprises a diamond-shaped aperture 126 at its center point. In a preferred embodiment, the second-end 120 comprises a slight dome profile. The pliable sleeve 110 comprises a length of approximately one-inch. The pliable sleeve 110 may be provided in a plurality of sizes. The pliable sleeve 110 may be colored coded and provides color indication relative to a size of the pliable sleeve 110 in order to readily identify a size of one of the pliable sleeves 110.

Figure 4:
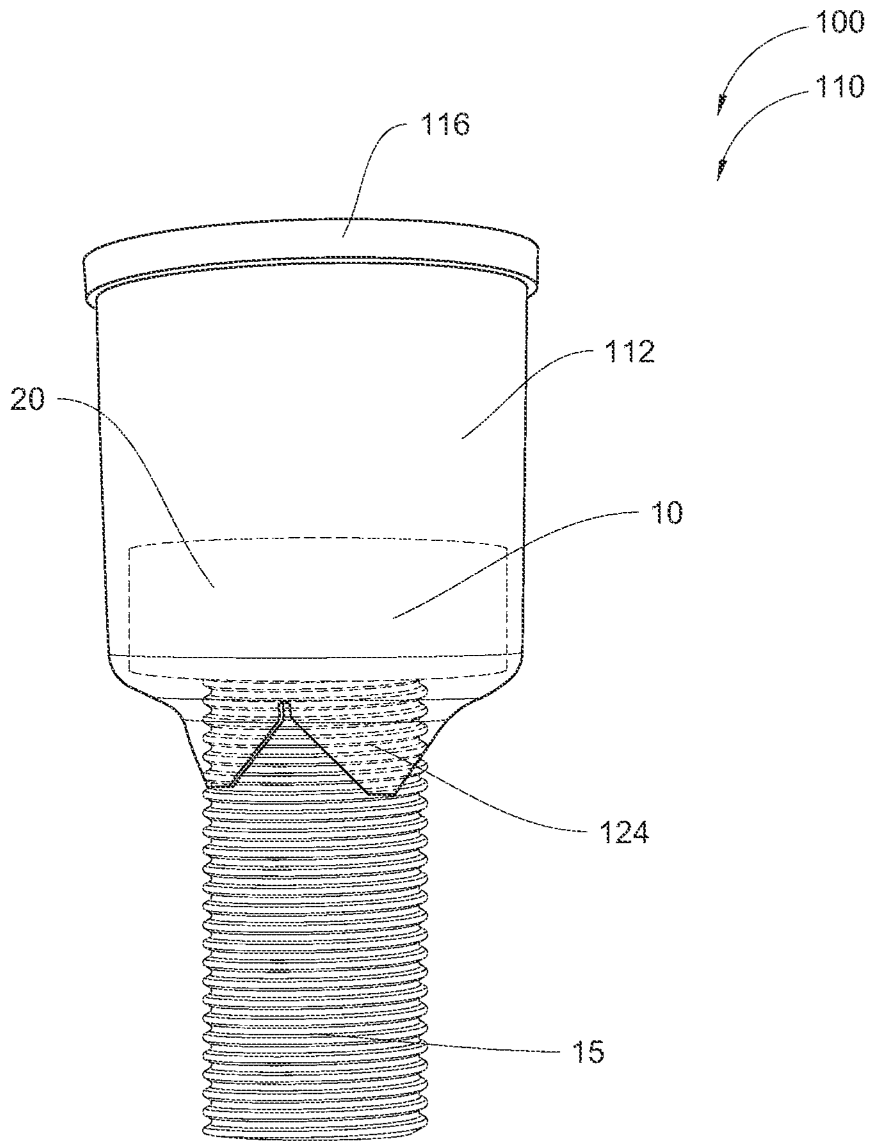
FIG. 4 is a side view of the fastener securing sleeve of FIG. 1 in an installed condition, according to an embodiment of the present disclosure.

FIG. 4 is a side view of the fastener securing sleeve 100 of FIG. 1 in an installed condition, according to an embodiment of the present disclosure. As shown, the fastener securing sleeve 100 is configured to receive and secure a fastener 10 such as a screw or bolt within. The head portion 20 of the fastener 10 is aligned with and contacting an interior surface 128 of the second-end 120 comprising the X-pattern slit 122 during use. The shaft portion 15 of the fastener 10 passes through the diamond-shaped aperture 126 of the X-pattern slit 122 and the series of flaps 124 are configured to contour around the shaft portion 15 of the fastener 10 and further secure the fastener 10 in position.

Figure 5:
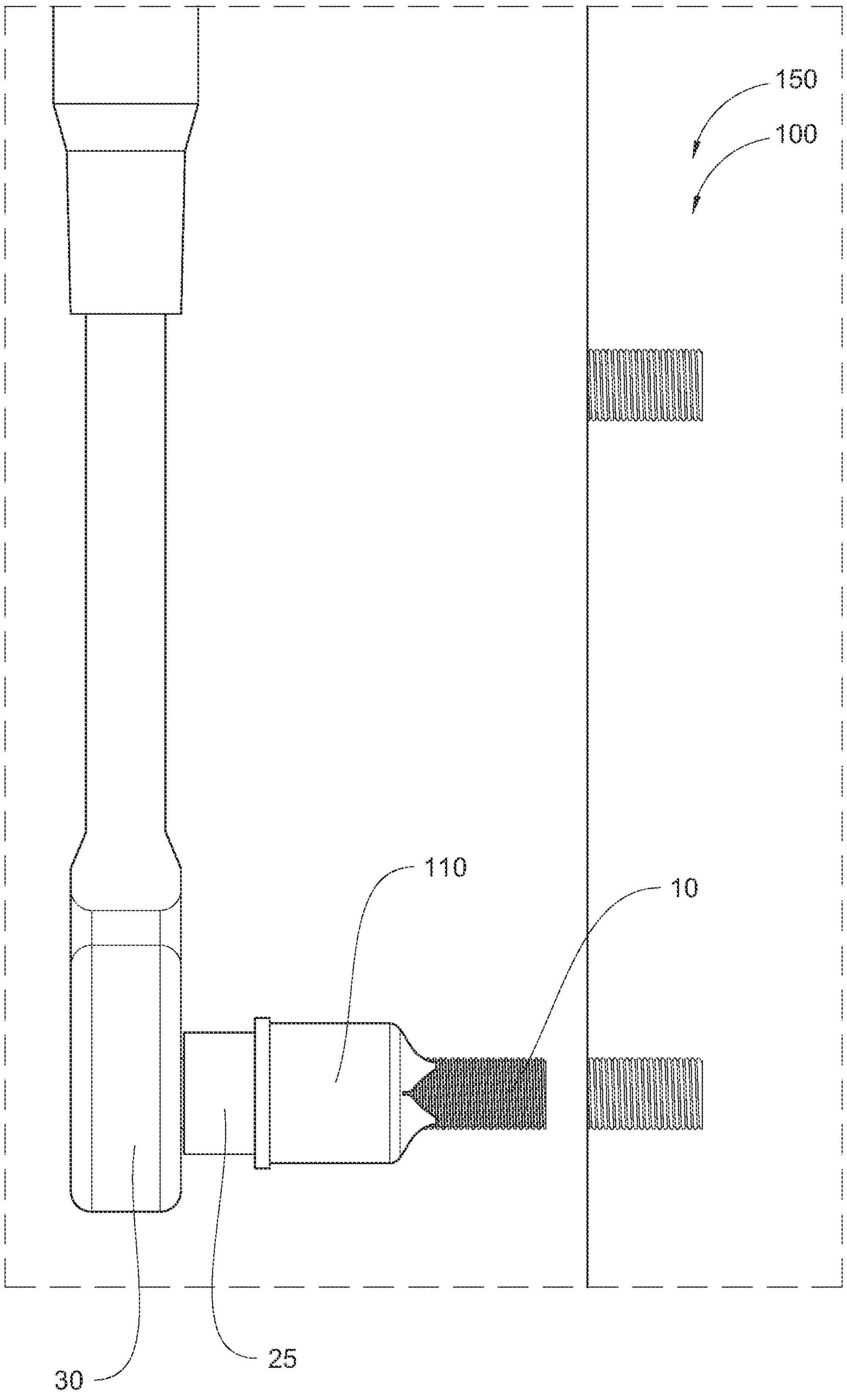
FIG. 5 is a side view of the first-embodiment of the fastener securing sleeve during an 'in-use' condition, according to an embodiment of the disclosure.

FIG. 5 is a side view of the first-embodiment of the fastener securing sleeve 100 during an 'in-use' condition 150, according to an embodiment of the disclosure. A user may insert a socket 25 upon a socket wrench, and then affix the fastener 10 securing sleeve upon the socket 25. The user may then slip a fastener 10, such as but not limited to a bolt, through the X-pattern slit 122 of the fastener securing sleeve and set the fastener 10 within the socket 25. The user may then apply the fastener 10 wherever needed, even in distant and obstructed locations, and even with only one hand holding the tool 30 hosting the fastener securing sleeve. The fastener 10 will remain secured within the socket 25. After mounting attachment of the fastener 10, the user may then simply pull the tool 30 away, which will detach the fastener 10 securing sleeve from the fastener 10.

Figure 6:
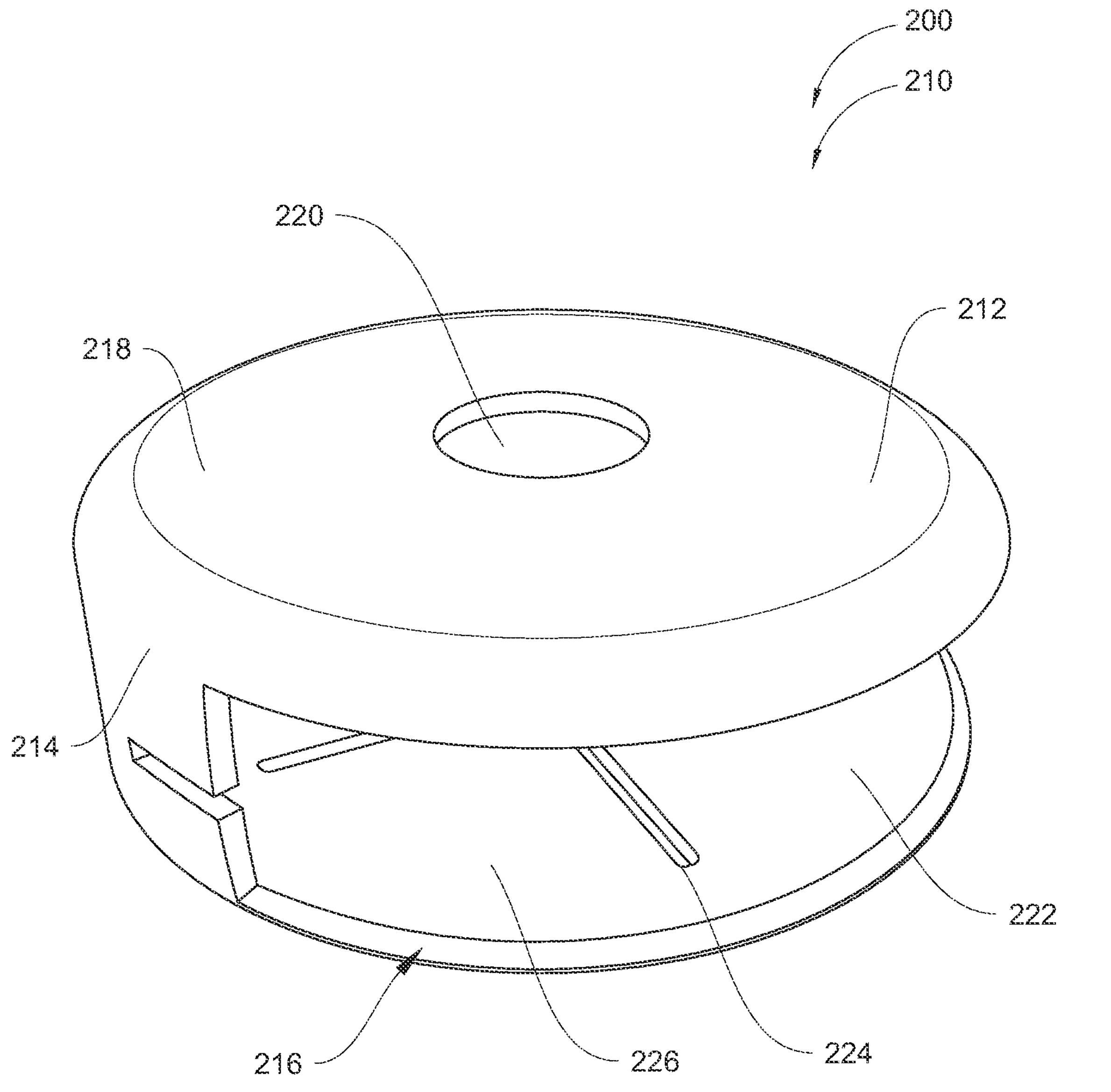
FIG. 6 is a perspective view of a second-embodiment of the fastener securing sleeve of FIG. 1.

FIG. 6 is a perspective view of a second-embodiment of the fastener securing sleeve 100 of FIG. 1. The second-embodiment of the fastener securing sleeve 200 is configured to be used with a tool 30 such as a box-end wrench. The fastener securing sleeve 200 includes a pliable sleeve 210 comprising a hollow disc-like body 212. The hollow disc-like body 212 is configured to releasably-secure a fastener 10 to a tool-head of a tool 30 in order to set and start the fastener 10. The pliable sleeve 210 comprises a side wall 214 having an opening 216 sized and configured to accept the tool-head, a first-end 218 having an aperture 220, and a second-end 222 comprising an X-pattern slit 224. The X-pattern slit 224 has a series of flaps 226 configured to receive and secure the fastener 10 within. The fastener securing sleeve 200 ensures that fasteners 10, including but not limited to nuts, bolts and screws, remain in wrenches and sockets 25 during attempted applications of fasteners 10.

Figure 7:
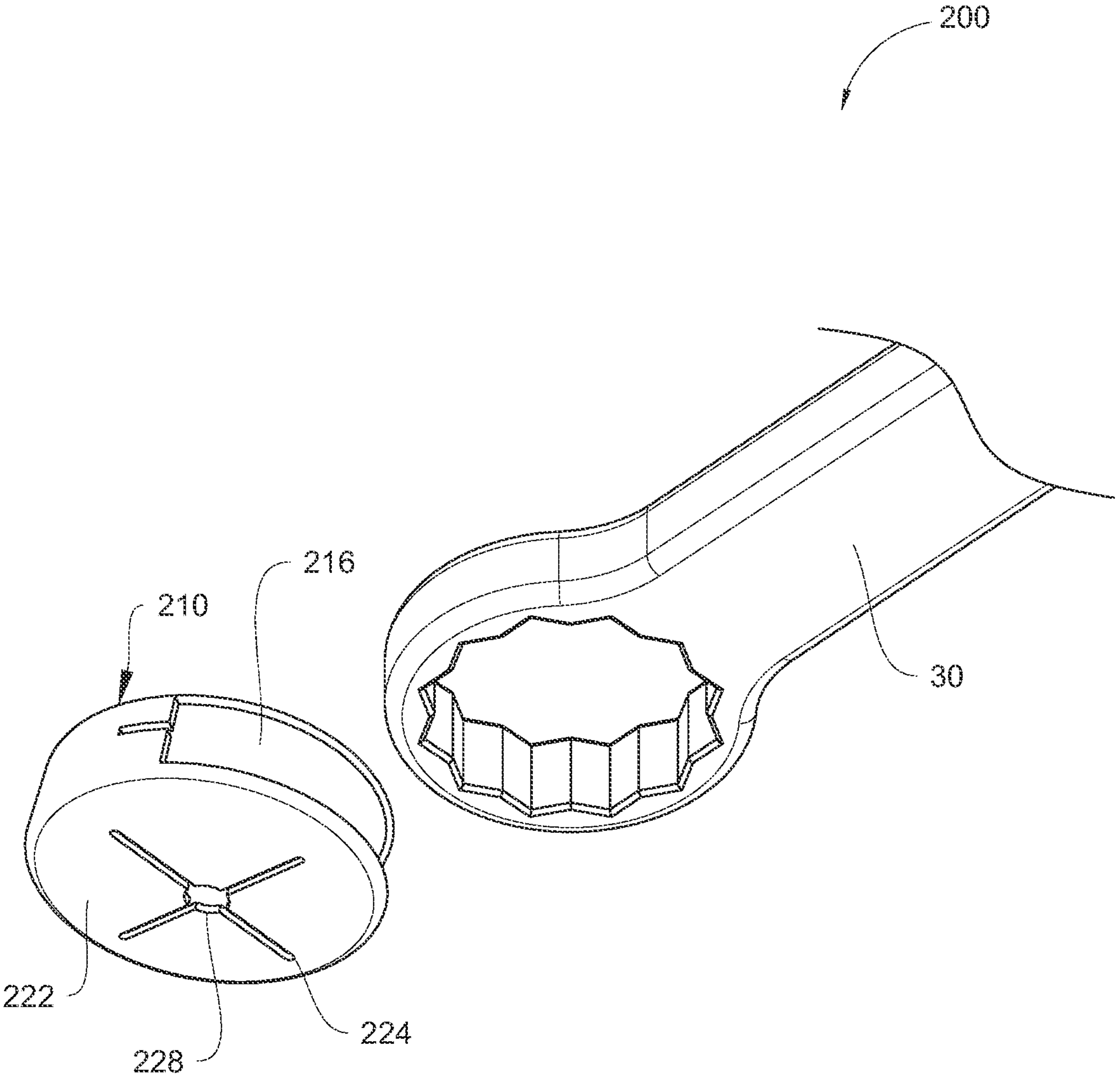
FIG. 7 is a bottom perspective view of the second-embodiment of the fastener securing sleeve of FIG. 1.

FIG. 7 is a bottom perspective view of the second-embodiment of the fastener securing sleeve 100 of FIG. 1. As shown, the pliable sleeve 210 includes the hollow disc-like body 212 having the opening 216 sized and configured to accept the tool-head along the side wall 214. The second-end comprises the X-pattern slit 224 sized and arranged to allow a shaft portion 15 of the fastener 10 to pass therethrough and restricts a head portion 20 of the fastener 10 from passing therethrough while setting the fastener 10. The X-pattern slit 224 comprises a diamond-shaped aperture 228 at its center point. The aperture 220 of the first-end 218, shown in FIG. 6, is in alignment with the diamond-shaped aperture 228 of the X-pattern slit 224.

Figure 8:
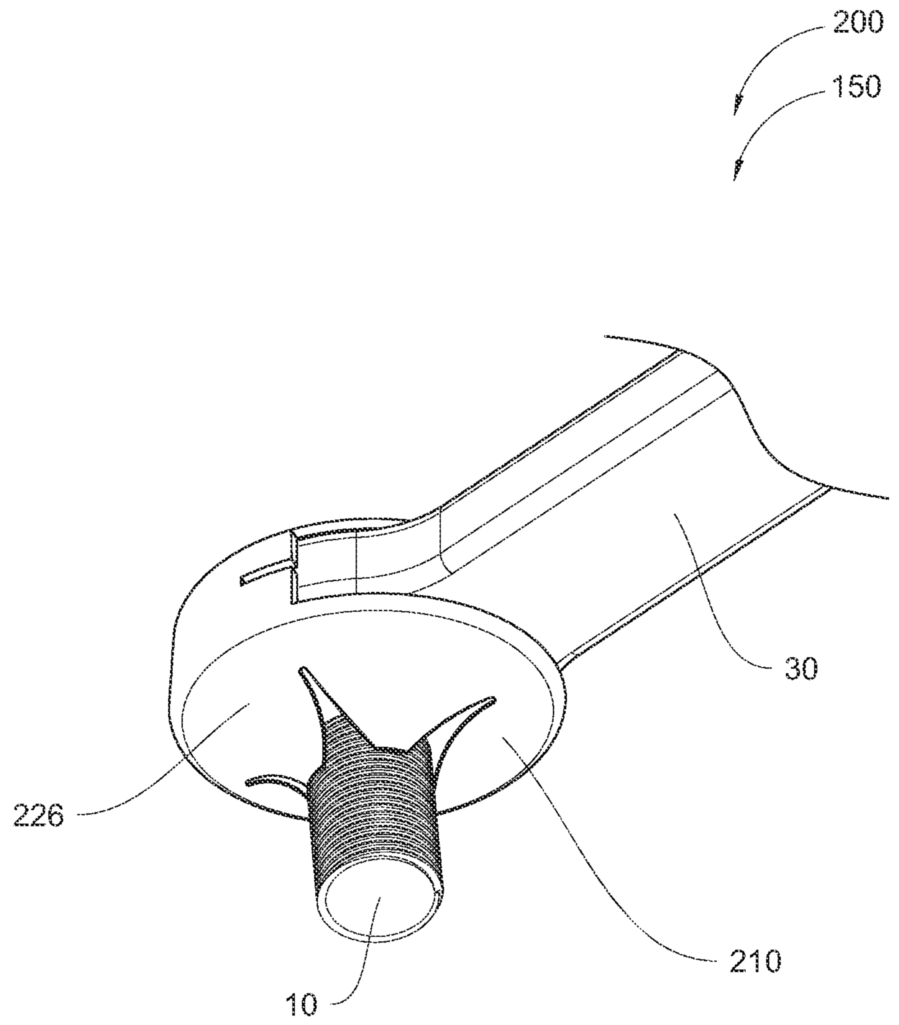
FIG. 8 is a bottom perspective view of the second-embodiment of the fastener securing sleeve during an 'in-use' condition.

FIG. 8 is a bottom perspective view of the second-embodiment of the fastener securing sleeve 100 during an 'in-use' condition. The fastener securing sleeve 200 provides an easy-to-use pliable sleeve that maintains a fastener 10 within a socket 25 or wrench while the fastener 10 is being started and set. The hollow disc-like body slips 212 on to a box-end wrench. The aperture 220 of the first-end 218 accepts a fastener 10, such as a bolt, so the bolt can be screwed into place. Then the box-end wrench may be removed and the bolt head will slip through the diamond-shaped aperture 228 of the X-pattern slit 224. The series of flaps 226 include triangle shaped pliable sections configured to contour around and further secure the fastener 10 in position during use. The pliable sleeve 210 comprises an elasticized material. The elasticity of the pliable sleeve 210 allows a single unit to be used with wrenches/sockets 25 of similar-yet-different sizes.

According to one embodiment, the fastener securing sleeve 100 may be arranged as a kit. In particular, the fastener securing sleeve 100 may further include a set of instructions. The instructions may detail functional relationships in relation to the structure of the fastener securing sleeve 100 such that the fastener securing sleeve 100 can be used, maintained, or the like, in a preferred manner. Different versions of the pliable sleeve may be provided in a plurality of sizes, the pliable sleeve may be colored coded and provides color indication relative to a size of the pliable sleeve in order to readily identify a size of one of the pliable sleeves.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A fastener securing sleeve, the fastener securing sleeve comprising:

a pliable sleeve comprising a hollow disc-like body configured to releasably secure a fastener to a tool-head of a tool in order to set and start said fastener, said pliable sleeve having, a side wall having an opening sized and configured to accept said toolhead, a first-end having an aperture, and a second-end comprising an X-pattern slit having a series of flaps configured to receive and secure said fastener within.

2. The fastener securing sleeve of claim 1, wherein said tool is a box-end wrench.

3. The fastener securing sleeve of claim 1, wherein said X-pattern slit is sized and arranged to allow a shaft portion of said fastener to pass therethrough and restricts a head portion of said fastener from passing therethrough while setting said fastener.

4. The fastener securing sleeve of claim 3, wherein said X-pattern slit comprises a diamond-shaped aperture at its center point.

5. The fastener securing sleeve of claim 4, wherein said aperture of said first-end is in alignment with said diamond-shaped aperture of said X-pattern slit.

6. The fastener securing sleeve of claim 1, wherein said series of flaps include triangle shaped pliable sections configured to contour around and further secure said fastener in position.

7. The fastener securing sleeve of claim 1, wherein said pliable sleeve comprises an elasticized material.

8. The fastener securing sleeve of claim 1, wherein said pliable sleeve is provided in a plurality of sizes, said pliable sleeve is colored coded and provides color indication relative to a size of said pliable sleeve in order to readily identify a size of one of said pliable sleeves.

* * * * *